(12) United States Patent
Kadavelugu et al.

(10) Patent No.: US 12,101,038 B2
(45) Date of Patent: Sep. 24, 2024

(54) UNINTERRUPTIBLE POWER SUPPLY HAVING SHORT CIRCUIT LOAD CAPABILITY

(71) Applicant: ABB Schweiz AG, Baden (CH)

(72) Inventors: Arun K. Kadavelugu, Raleigh, NC (US); Maziar Mobarrez, Irvine, CA (US)

(73) Assignee: ABB Schweiz AG, Baden (CH)

( * ) Notice: Subject to any disclaimer, the term of this patent is extended or adjusted under 35 U.S.C. 154(b) by 168 days.

(21) Appl. No.: 17/532,245

(22) Filed: Nov. 22, 2021

(65) Prior Publication Data
US 2023/0163697 A1     May 25, 2023

(51) Int. Cl.
*H02M 7/537* (2006.01)
*H02J 9/06* (2006.01)
*H02M 1/08* (2006.01)
*H02M 1/32* (2007.01)
*H02M 7/483* (2007.01)

(52) U.S. Cl.
CPC ............. *H02M 7/537* (2013.01); *H02J 9/062* (2013.01); *H02M 1/08* (2013.01); *H02M 1/32* (2013.01); *H02M 7/483* (2013.01)

(58) Field of Classification Search
CPC ...... H02M 7/537; H02M 7/483; H02M 7/487; H02M 7/53871; H02M 1/08; H02M 1/32; H02J 9/062
See application file for complete search history.

(56) References Cited

U.S. PATENT DOCUMENTS

| | | | |
|---|---|---|---|
| 10,033,299 B2 | 7/2018 | Ohnishi et al. | |
| 2005/0281065 A1* | 12/2005 | Nojima | H02M 7/487 363/98 |
| 2016/0118910 A1 | 4/2016 | Torrico-Bascope | |
| 2017/0187304 A1 | 6/2017 | Fujii et al. | |
| 2018/0131289 A1* | 5/2018 | Ohnishi | H02M 7/217 |
| 2018/0175777 A1* | 6/2018 | Ando | H02M 1/32 |

(Continued)

OTHER PUBLICATIONS

Rabkowski et al., "SiC-based T-type Modules for Multi-phase Inverter with Coupled Inductors, " IEEE International conference on compatability, Power Electronics and Power Engineering, 2017.

(Continued)

*Primary Examiner* — Kyle J Moody
*Assistant Examiner* — Jye-June Lee
(74) *Attorney, Agent, or Firm* — McCarter & English, LLP

(57) ABSTRACT

An inverter is provided. The inverter includes a DC bus having positive and negative rails and an inverter arm coupled between the positive and negative rails of the DC bus. The inverter arm includes first and second silicon carbide transistor having a current-conducting terminals connected to a central node of the inverter arm. The inverter further includes at least one silicon transistor having a third current-conducting terminal connected to the central node of the inverter arm. The inverter further includes a gate driver circuit configured to switch the first silicon carbide transistor and the second silicon carbide transistor to convert DC from said DC bus into AC, and to switch said at least one silicon transistor, when the inverter arm is subjected to a load-side short circuit current, to freewheel the load-side short circuit current.

18 Claims, 3 Drawing Sheets

(56) References Cited

U.S. PATENT DOCUMENTS

2018/0337590 A1* 11/2018 He .................. H02M 1/32
2021/0119442 A1    4/2021 Pettersson

OTHER PUBLICATIONS

Salmon, "Circuit topologies for pwm boost rectifiers operated from 1-phase and 3-phase ac supplies and using either single or split dc rail voltage outputs", IEEE Applied Power Electronics Conference and Exposition (APEC), 1995.
International Search Report and Written Opinion issued in International Application No. PCT/US2022/080238, mailed Mar. 16, 2023, 15 pages.
Zhang Yibin et al, "Transistor-Clamped Multilevel H-Bridge Inverter in Si and SiC Hybrid Configuration for High-Efficiency Photovoltaic Applications", 2018 IEEE Energy Conversion Congress and Exposition (ECCE), IEEE, (Sep. 23, 2018), doi:10.1109/ECCE.2018. 8557394, pp. 2536-2542, XP033463465.

* cited by examiner

UNINTERRUPTIBLE POWER SUPPLY HAVING SHORT CIRCUIT LOAD CAPABILITY

FIELD OF THE DISCLOSURE

The present disclosure relates generally to uninterruptible power supplies (UPSs). In particular, the present disclosure relates to silicon carbide (SIC) UPSs having short circuit load capability.

BACKGROUND

A UPS system provides emergency power to a load when a primary input power source fails. Such systems generally include an energy storage device (e.g., a battery) and an inverter, which converts power provided by the energy storage device to power suitable for the load, such as by converting direct current (DC) to alternating current (AC). The inverter generally includes semiconductor switches (e.g., metal-oxide-semiconductor field-effect transistor (MOSFET) switches), which are controlled to provide a desired power and/or current output.

As UPS systems operate continuously, increasing efficiency is a critical requirement for UPS products. Using silicon carbide (SIC) semiconductors for the inverter, the efficiency can be improved with potentially lower system-level costs. However, during a short circuit event at the load, SiC semiconductors experience a relatively large current and may overheat due to their relatively small chip size. Accordingly, to meet short circuit current demands, UPS systems generally include an increased number of SiC chips, which may significantly increase the cost of the UPS system. A UPS system that can meet a given short circuit current demand using a fewer number of SiC chips is therefore desirable.

BRIEF DESCRIPTION

In one aspect, an inverter is provided. The inverter includes a DC bus having positive and negative rails. The inverter further includes an inverter arm coupled between the positive and negative rails of the DC bus. The inverter arm includes a first silicon carbide transistor having a first current-conducting terminal connected to a central node of the inverter arm, and a second silicon carbide transistor having a second current-conducting terminal connected to the central node of said inverter arm. The inverter further includes at least one silicon transistor having a third current-conducting terminal connected to the central node of the inverter arm. The inverter further includes a gate driver circuit configured to switch the first silicon carbide transistor and the second silicon carbide transistor to convert DC from said DC bus into AC, and to switch said at least one silicon transistor, when the inverter arm is subjected to a load-side short circuit current, to freewheel the load-side short circuit current.

In another aspect, an inverter circuit is provided. The inverter circuit includes a DC bus having positive and negative rails. The inverter circuit further includes an inverter arm coupled between the positive and negative rails of said DC bus. The inverter arm includes a first silicon carbide transistor having a first current-conducting terminal connected to a central node of the inverter arm, and a second silicon carbide transistor having a second current-conducting terminal connected to the central node of the inverter arm. The inverter circuit further includes at least one silicon transistor having a third current-conducting terminal connected to the central node of the inverter arm. The first silicon carbide transistor and the second silicon carbide transistor are configured to be switched by a gate driver circuit to convert DC from said DC bus into AC, and the at least one silicon transistor is configured to be switched by the gate driver circuit, when the inverter arm is subjected to a load-side short circuit current, to freewheel the load-side short circuit current.

In another aspect, a method for operating an inverter is provided. The inverter includes a DC bus having positive and negative rails, an inverter arm including a first silicon carbide transistor having a first current-conducting terminal connected to a central node of the inverter arm and a second silicon carbide transistor having a second current-conducting terminal connected to the central node of the inverter arm, and at least one silicon transistor having a third current-conducting terminal connected to the central node of the inverter arm. The method includes switching the first silicon carbide transistor and the second silicon carbide transistor to convert DC from the DC bus into AC. The method further includes switching the at least one silicon transistor, when the inverter arm is subjected to a load-side short circuit current, to freewheel the load-side short circuit current.

The foregoing and other aspects, features, details, utilities, and advantages of the present disclosure will be apparent from reading the following description and claims, and from reviewing the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
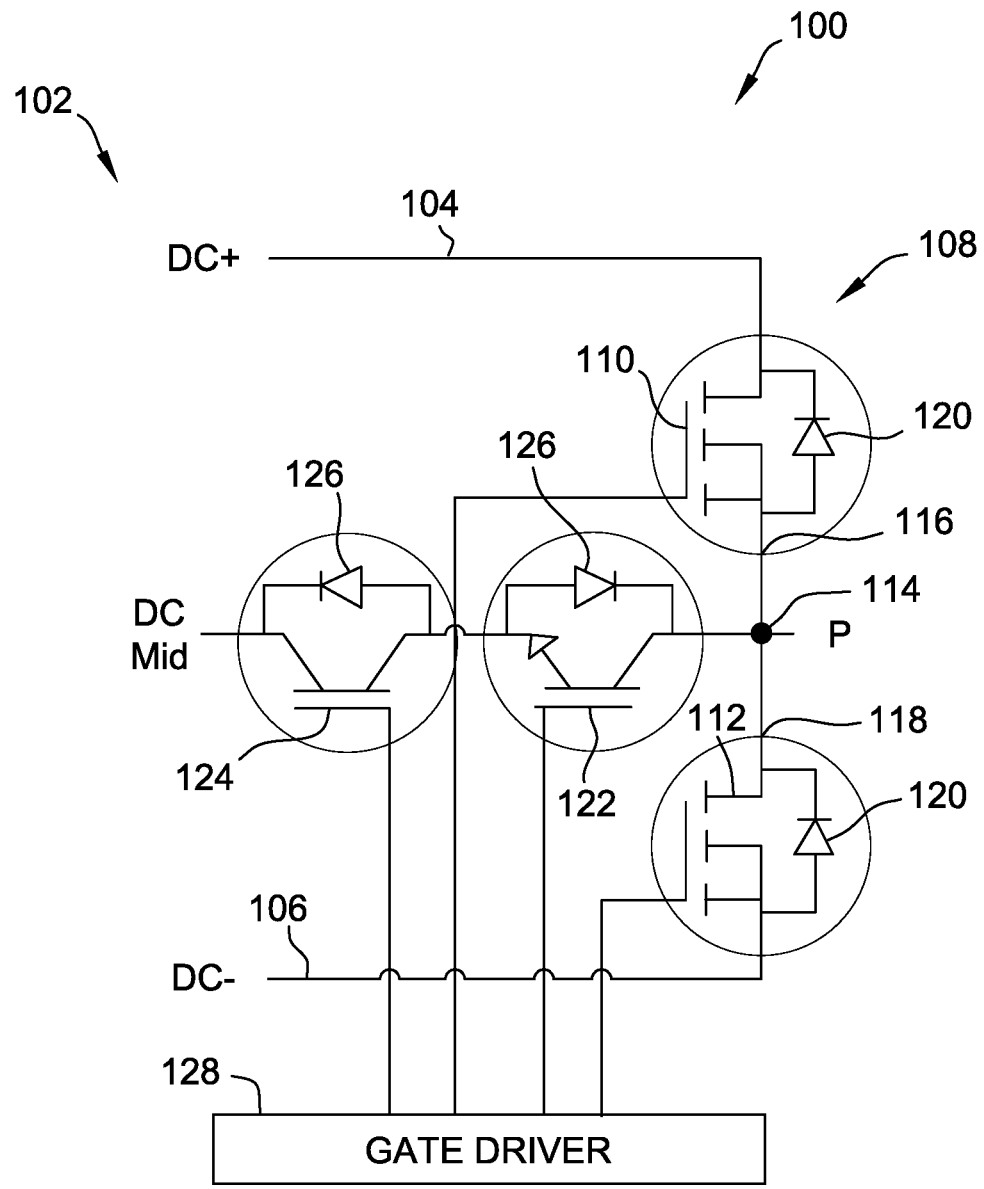
FIG. 1 is a schematic diagram of an example inverter having a three-level topology.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION OF THE DISCLOSURE

The present disclosure is directed to an inverter circuit that may be used in a UPS or other system that provides AC power to a load. The inverter circuit includes a DC bus having positive and negative rails, which may be coupled to a DC source. The inverter circuit further includes an inverter arm coupled between the positive and negative rails of the DC bus. The inverter arm includes two SiC transistors, which are coupled at a central node of the inverter arm, which in turn may be coupled to a load. The inverter arm further includes at least one silicon transistor connected to the central node of the inverter arm. The inverter circuit further includes a gate driver circuit configured to, during normal operation of the inverter, switch the first and second SiC transistors to convert DC from the DC bus into alternating current AC at the central node. When the inverter arm is subjected to a load-side short circuit current, the gate driver controls the at least one silicon transistor to freewheel the load-side short circuit current, which reduces the current load on the SiC transistors to increase the overall short circuit capacity of the inverter circuit. Assuming an inverter system made up of one or more of this inverter circuit has a given current requirement, utilizing silicon transistors to increase the short circuit current capacity and reduce the peak short circuit current of each individual inverter circuit reduces the number of inverter circuits, and associated components such as inductors, needed to meet the system-level current capacity. Accordingly, the overall cost of the system in terms of material and/or space may be reduced. Further, because the peak currents are reduced, the system may have improved reliability when electromagnetic interference (EMI) noise is present.

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

FIG. 1 illustrates an example inverter 100. Inverter 100 includes a direct current (DC) bus 102 including a positive rail 104 and a negative rail 106. Inverter 100 further includes an inverter arm 108 coupled between positive rail 104 and negative rail 106. Inverter arm 108 includes a first SiC transistor 110 and a second SiC transistor 112. In certain embodiments, first SiC transistor 110 and second SiC transistor 112 are coupled to define a central node 114 therebetween, and include a first current-conducting terminal 116 and a second current-conducting terminal 118, respectively. Central node 114 may be coupled to a load to provide, for example, alternating current (AC) to the load. SiC diodes 120 are coupled between respective source and drain terminals of first SiC transistor 110 and second SiC transistor 112. In certain embodiments, SiC diodes 120 may be external diodes and/or body-diodes respectively integrated internally into first SiC transistor 110 and second SiC transistor 112.

Inverter 100 further includes a first silicon transistor 122 and a second silicon transistor 124. First silicon transistor 122 is coupled to central node 114 of inverter arm 108, and second silicon transistor 124 is coupled in anti-series (i.e., in series with an opposite-facing polarity) to first silicon transistor 122. First silicon transistor 122 and second silicon transistor 124 are unidirectional voltage blocking devices, and therefore are connected in anti-series to block voltage in either direction during normal operation of inverter 100. Silicon diodes 126 are coupled between respective collector terminals and emitter terminals of first silicon transistor 122 and second silicon transistor 124 to enable bidirectional current flow. When activated, first silicon transistor 122 and second silicon transistor 124 form a current path from central node 114 to an external node, such as a DC bus mid-point. In some embodiments, first silicon transistor 122 and second silicon transistor 124 are insulated gate bipolar transistors (IGBTs). Because first silicon transistor 122, second silicon transistor 124, and silicon diodes 126 are made from silicon, they may be relatively inexpensive compared to similar components made from other materials, such as SiC. In alternative to the example embodiment shown in FIG. 1, in certain embodiments, inverter 100 includes more or fewer than two silicon transistors.

Inverter 100 further includes a gate driver circuit 128 coupled to respective gates of first SiC transistor 110, second SiC transistor 112, first silicon transistor 122, and second silicon transistor 124. During normal operation of inverter 100, gate driver circuit 128 is configured to switch first SiC transistor 110, second SiC transistor 112 to convert DC from the DC bus into AC. When a short circuit condition occurs at the load, gate driver circuit 128 is configured to switch first silicon transistor 122 and second silicon transistor 124 to freewheel the load-side short circuit current. In other words, at least some of the short circuit current passes through first silicon transistor 122 and second silicon transistor 124 rather than being dissipated through first SiC transistor 110 and second SiC transistor 112. First silicon transistor 122 and second silicon transistor 124 are activated only during short circuit conditions, and are deactivated by gate driver circuit 128 during normal operation of inverter 100.

By providing an additional current path from central node 114 when activated, first silicon transistor 122 and second silicon transistor 124 reduce a current load on first SiC transistor 110 and second SIC transistor 112 during short circuit events, and increase the overall capacity of inverter 100 to handle load-side short circuits. In some embodiments, first silicon transistor 122 and second silicon transistor 124 handle load-side short circuit current, for example, between 300% and 500% of a nominal current converted by the first SiC transistor 110 and second SiC transistor 112. Because a system may include a certain number (N) of interleaved inverter arms 108 in order to achieve a specified load-side short circuit capacity, by including silicon transistors such as first silicon transistor 122 and second silicon transistor 124 for each inverter arm 108, a fewer number (<N) of inverter arms 108 and SiC transistors are needed, reducing the overall cost of the system.

During the short-circuit event, the freewheeling of short-circuit current through first silicon transistor 122, second silicon transistor 124, and silicon diodes 126, a significantly lower switching frequency is used compared to the switching frequency used during normal operation, which reduces switching loss that may be associated with silicon diodes. Switching of first silicon transistor 122 and second silicon transistor 124 is disabled during normal operation of the inverter 100, when the switching frequency is higher and greater switching losses could result.

Figure 2:
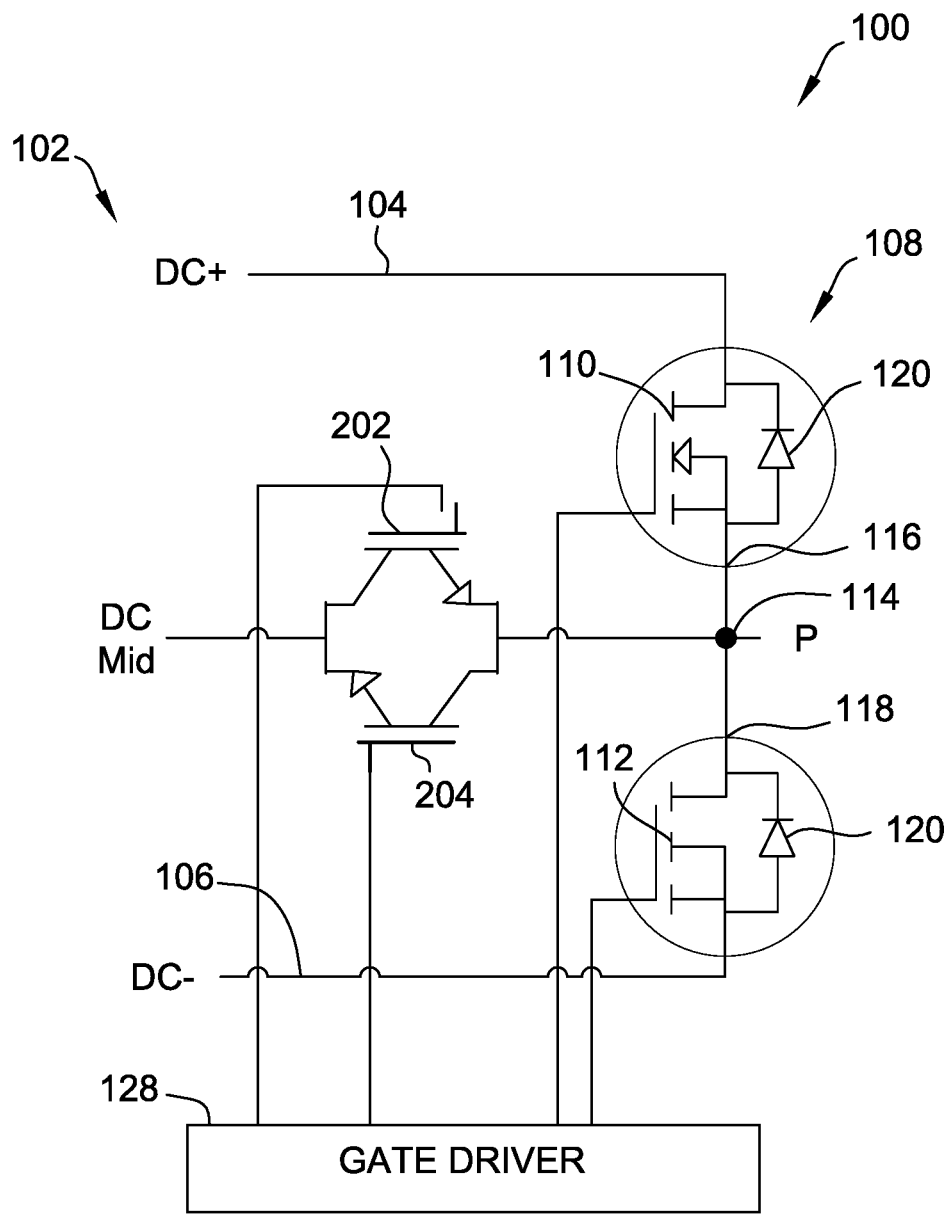
FIG. 2 is a schematic diagram of an of another example inverter having a three-level topology.

FIG. 2 illustrates another example inverter 200. Inverter 200 includes DC bus 102 and inverter arm 108, which generally function as described with respect to FIG. 1. Inverter 200 includes a first silicon transistor 202 and a second silicon transistor 204 coupled to each other in anti-parallel and to central node 114 of inverter arm 108.

Similar to first silicon transistor 122 and second silicon transistor 124 described with respect to FIG. 1, when a short circuit condition occurs at the load, gate driver circuit 128 is configured to switch first silicon transistor 202 and second silicon transistor 204 to freewheel the load-side short circuit current. As with first silicon transistor 122 and second silicon transistor 124, first silicon transistor 202 and second silicon transistor 204 are activated only during short circuit conditions, and are disabled during normal operation of inverter 100. Because, first silicon transistor 202 and second silicon transistor 204 are bidirectional blocking devices that conduct in only one direction, first silicon transistor 202 and a second silicon transistor 204 are coupled in anti-parallel to achieve bidirectional current flow.

Figure 3:
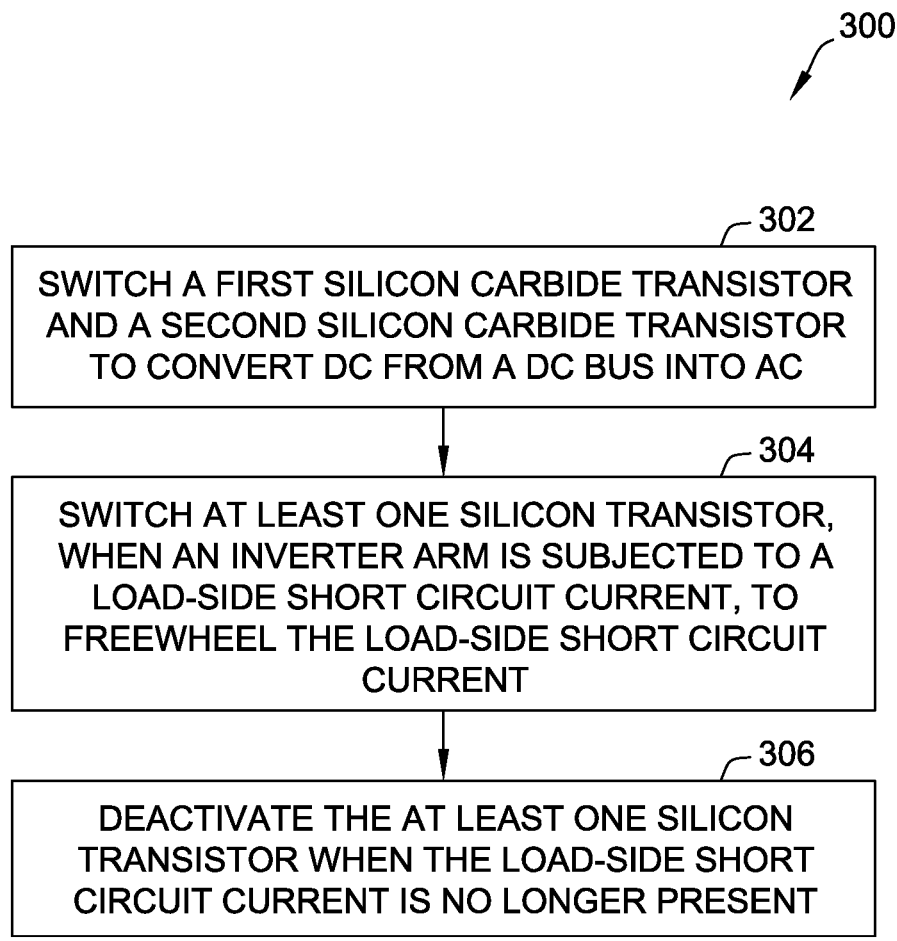
FIG. 3 is a flow diagram of an example method for operating an inverter.

FIG. 3 is a flow diagram of an example method 300 for operating an inverter (such as inverter 100). The inverter includes a DC bus (such as DC bus 102) having positive and negative rails (such a positive rail 104 and negative rail 106), an inverter arm (such as inverter arm 108) including a first SiC transistor (such as first SiC transistor 110) having a first current-conducting terminal (such as first current-conducting terminal 116) connected to a central node (such as central node 114) of the inverter arm and a second SiC transistor (such as second SiC transistor 112) having a second current-conducting terminal (such as second current-conducting terminal 118) connected to the central node of the inverter arm, and at least one silicon transistor (such as first silicon transistor 122 and second silicon transistor 124) having a third current-conducting terminal connected to the central node of the inverter arm. In certain embodiments, the inverter arm is one of a plurality of interleaved arms of the inverter.

Method 300 includes switching 302 the first SiC transistor and the second SiC transistor to convert DC from the DC bus into alternating current (AC). Method 300 further includes switching 304 the at least one silicon transistor, when the inverter arm is subjected to a load-side short circuit current, to freewheel the load-side short circuit current. In some embodiments, method 300 further includes deactivating 306 the at least one silicon transistor when the load-side short circuit current is no longer present.

In certain embodiments, load-side short circuit current is between 300-500% of a nominal current converted by switching the first SiC transistor and the second SiC transistor.

In some embodiments, the at least one silicon transistor includes a first IGBT. In some such embodiments, the at least one silicon transistor further includes a second IGBT arranged in anti-series or anti-parallel with the first IGBT. In embodiments in which the silicon transistors are arranged in anti-series, a silicon diode may be coupled between collector and emitter terminals of each IGBT.

In certain embodiments, the first SiC transistor and second SiC transistor are MOSFETs. In such embodiments, a SiC diode may be coupled between source and drain terminals of each MOSFET.

Example embodiments of inverters for a UPS system, as well as methods for operating inverters in a UPS system, are described in detail. The circuits and methods are not limited to the specific embodiments described herein, but rather, components of systems and/or steps of the methods may be utilized independently and separately from other components and/or steps described herein. For example, the method may also be used in combination with other components and are not limited to practice only with the circuits as described herein. Rather, the example embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An inverter comprising:
    a direct current (DC) bus having positive and negative rails;
    an inverter arm coupled between the positive and negative rails of said DC bus, the inverter arm comprising:
        a first silicon carbide transistor having a first current-conducting terminal connected to a central node of said inverter arm; and
        a second silicon carbide transistor having a second current-conducting terminal connected to the central node of said inverter arm;
    at least one silicon transistor having a third current-conducting terminal connected to the central node of said inverter arm, said at least one silicon transistor comprising a first silicon transistor and a second silicon transistor arranged in anti-series with said first silicon transistor;
    a first silicon diode coupled between collector and emitter terminals of said first silicon transistor;
    a second silicon diode coupled between collector and emitter terminals of said second silicon transistor; and
    a gate driver circuit configured to:
        switch said first silicon carbide transistor and said second silicon carbide transistor to convert DC from said DC bus into alternating current (AC); and
        switch said at least one silicon transistor, only when said inverter arm is subjected to a load-side short circuit current, to freewheel the load-side short circuit current.

2. The inverter of claim 1, wherein said gate driver circuit is further configured to deactivate said at least one silicon transistor when the load-side short circuit current is not present.

3. The inverter of claim 1, wherein said at least one silicon transistor is configured to handle load-side short circuit currents greater than 300% of a nominal current converted by said first silicon carbide transistor and said second silicon carbide transistor.

4. The inverter of claim 1, wherein said at least one silicon transistor is configured to handle load-side short circuit currents up to 500% of a nominal current converted by said first silicon carbide transistor and said second silicon carbide transistor.

5. The inverter of claim 1, wherein said first silicon transistor comprises a first insulated gate bipolar transistor (IGBT).

6. The inverter of claim 5, wherein said second silicon transistor comprises a second IGBT arranged in anti-series with said first IGBT.

7. The inverter of claim 1, wherein said first silicon carbide transistor and said second silicon carbide transistor are metal-oxide-semiconductor field-effect transistors (MOSFETs).

8. The inverter of claim 7, further comprising:
a first silicon carbide diode coupled between source and drain terminals of said first silicon carbide transistor; and
a second silicon carbide diode coupled between source and drain terminals of said second silicon carbide transistor.

9. The inverter of claim 1, wherein said inverter arm is one of a plurality of interleaved arms of said inverter.

10. An inverter circuit comprising:
a direct current (DC) bus having positive and negative rails;
an inverter arm coupled between the positive and negative rails of said DC bus, said inverter arm comprising:
a first silicon carbide transistor having a first current-conducting terminal connected to a central node of said inverter arm; and
a second silicon carbide transistor having a second current-conducting terminal connected to the central node of said inverter arm;
at least one silicon transistor having a third current-conducting terminal connected to the central node of said inverter arm, said at least one silicon transistor comprising a first silicon transistor and a second silicon transistor arranged in anti-parallel with said first silicon transistor;
a first silicon diode coupled between collector and emitter terminals of said first silicon transistor;
a second silicon diode coupled between collector and emitter terminals of said second silicon transistor,
wherein said first silicon carbide transistor and said second silicon carbide transistor are configured to be switched by a gate driver circuit to convert DC from said DC bus into alternating current (AC), and wherein said at least one silicon transistor is configured to be switched by the gate driver circuit, only when said inverter arm is subjected to a load-side short circuit current, to freewheel the load-side short circuit current.

11. The inverter circuit of claim 10, wherein said at least one silicon transistor is further configured to be deactivated by the gate driver circuit when the load-side short circuit current is not present.

12. The inverter circuit of claim 10, wherein said at least one silicon transistor is configured to handle load-side short circuit currents greater than 300% of a nominal current converted by said first silicon carbide transistor and said second silicon carbide transistor.

13. The inverter circuit of claim 10, wherein said at least one silicon transistor is configured to handle load-side short circuit currents up to 500% of a nominal current converted by said first silicon carbide transistor and said second silicon carbide transistor.

14. The inverter circuit of claim 10, wherein said first silicon transistor comprises a first insulated gate bipolar transistor (IGBT).

15. The inverter circuit of claim 14, wherein said second silicon transistor comprises a second IGBT.

16. A method for operating an inverter, the inverter including a direct current (DC) bus having positive and negative rails, an inverter arm including a first silicon carbide transistor having a first current-conducting terminal connected to a central node of the inverter arm and a second silicon carbide transistor having a second current-conducting terminal connected to the central node of the inverter arm, at least one silicon transistor having a third current-conducting terminal connected to the central node of the inverter arm, the at least one silicon transistor comprising a first silicon transistor and a second silicon transistor arranged in anti-series with said first silicon transistor, a first silicon diode coupled between collector and emitter terminals of said first silicon transistor, and a second silicon diode coupled between collector and emitter terminals of said second silicon transistor, said method comprising:
switching the first silicon carbide transistor and the second silicon carbide transistor to convert DC from the DC bus into alternating current (AC); and
switching the at least one silicon transistor, only when the inverter arm is subjected to a load-side short circuit current, to freewheel the load-side short circuit current.

17. The method of claim 16, further comprising deactivating the at least one silicon transistor when the load-side short circuit current is no longer present.

18. The method of claim 16, wherein the load-side short circuit current is between 300-500% of a nominal current converted by switching the first silicon carbide transistor and the second silicon carbide transistor.

\* \* \* \* \*